(12) United States Patent
Chung et al.

(10) Patent No.: US 8,690,372 B2
(45) Date of Patent: Apr. 8, 2014

(54) BACKLIGHT UNIT AND DISPLAY APPARATUS HAVING THE SAME

(71) Applicant: Seoul Semiconductor Co., Ltd., Ansan-si (KR)

(72) Inventors: Tae-Jin Chung, Ansan-si (KR); Seung-Ryeol Ryu, Ansan-si (KR); Weon Cho, Ansan-si (KR); Bi-Yong Jeong, Ansan-si (KR); Byeong-Gil An, Ansan-si (KR); Chong-Young Park, Ansan-si (KR); Jang-Hoon Lee, Ansan-si (KR)

(73) Assignee: Seoul Semiconductor Co., Ltd., Seoul (KR)

( * ) Notice: Subject to any disclaimer, the term of this patent is extended or adjusted under 35 U.S.C. 154(b) by 0 days.

(21) Appl. No.: 13/750,267

(22) Filed: Jan. 25, 2013

(65) Prior Publication Data

US 2013/0141477 A1    Jun. 6, 2013

Related U.S. Application Data

(63) Continuation of application No. 12/569,221, filed on Sep. 29, 2009, now Pat. No. 8,360,592.

(30) Foreign Application Priority Data

Sep. 29, 2008 (KR) .................. 10-2008-0095400
Dec. 29, 2008 (KR) .................. 10-2008-0135446

(51) Int. Cl.
*G09F 13/08*    (2006.01)
*G02F 1/13357*  (2006.01)

(52) U.S. Cl.
USPC ........................................ 362/97.1; 362/97.3

(58) Field of Classification Search
USPC ........ 362/600, 602, 606, 612, 621, 97.1, 97.3
See application file for complete search history.

(56) References Cited

U.S. PATENT DOCUMENTS

2002/0070914 A1*  6/2002  Bruning et al. ............... 345/102
2006/0245213 A1  11/2006  Beil et al.
2009/0290097 A1* 11/2009  Kim et al. ...................... 349/65
2009/0296026 A1  12/2009  Bae et al.

OTHER PUBLICATIONS

Non-Final Office Action dated Sep. 27, 2012 issued for U.S. Appl. No. 12/569,221.
Notice of Allowance dated Nov. 20, 2012 issued for U.S. Appl. No. 12/569,221.

* cited by examiner

*Primary Examiner* — David V Bruce
(74) *Attorney, Agent, or Firm* — H.C. Park & Associates, PLC

(57) ABSTRACT

An exemplary embodiment of the present invention discloses a backlight unit having a plurality of light-emitting blocks and a light source driving section. The plurality of light-emitting blocks is arranged in a matrix shape along first and second directions different from each other. Each of the light-emitting blocks includes a light source unit having at least one light-emitting chip to emit light, and a light guiding unit to guide the light. The light source driving section controls the light source unit of the light-emitting blocks to drive the light source unit.

15 Claims, 6 Drawing Sheets

BACKLIGHT UNIT AND DISPLAY APPARATUS HAVING THE SAME

CROSS REFERENCE TO RELATED APPLICATIONS

This application is a continuation of U.S. patent application Ser. No. 12/569,221, filed on Sep. 29, 2009, and now issued as U.S. Pat. No. 8,360,592, and claims priority from and the benefit of Korean Patent Application No. 10-2008-0095400, filed on Sep. 29, 2008 and Korean Patent Application No. 10-2008-0135446, filed on Dec. 29, 2008, which are all hereby incorporated by reference for all purposes as if fully set forth herein.

BACKGROUND

1. Field

Exemplary embodiments of the present invention relate to a backlight unit and a display apparatus having the backlight assembly and, more particularly, exemplary embodiments of the present invention relate to a backlight unit providing a liquid crystal display (LCD) apparatus with light and an LCD apparatus having the backlight assembly.

2. Discussion of the Background

In general, an LCD apparatus includes an LCD panel to display an image and a backlight unit disposed under the LCD panel to provide the LCD panel with light.

The LCD panel includes a first substrate having a thin film transistor (TFT) and a pixel electrode electrically connected to the TFT, a second substrate having a color filter corresponding to the pixel electrode and a common electrode, and a liquid crystal layer disposed between the first substrate and the second substrate.

The backlight unit includes a receiving container, a plurality of lamps disposed in parallel in the receiving container, and an optical member disposed over the lamps to improve optical characteristics of the light generated by the lamps. The optical member includes a light-diffusing plate diffusing the light to improve luminance uniformity.

The optical member is in general spaced apart from the lamps to improve diffusion of light. As a result, the thickness of the backlight unit increases.

SUMMARY OF THE INVENTION

Exemplary embodiments of the present invention provide a backlight unit with a reduced thickness.

Exemplary embodiments of the present invention also provide a display apparatus having the backlight unit.

Additional features of the invention will be set forth in the description which follows, and in part will be apparent from the description, or may be learned by practice of the invention.

An exemplary embodiment of the present invention discloses a backlight unit, comprising a plurality of light-emitting blocks arranged in a matrix shape along a first direction and a second direction, wherein the first direction and the second direction are different from each other, each of the light-emitting blocks comprising a light source unit, wherein each light source unit comprises a light-emitting chip to emit light and a light guiding unit to guide the light; and a light source driving section to control the light source unit of each of the light-emitting blocks and to drive the light source unit.

An exemplary embodiment of the present invention also discloses a backlight unit, comprising a light guiding unit comprising a light guiding body portion, an upper extending portion extended from an upper portion of a first side surface of the light guiding body portion, and a lower extending portion extended from a lower portion of a second side surface of the light guiding body portion, wherein the first side surface is opposite the second side surface; a first light source unit disposed under the upper extending portion to provide the upper extending portion with a first light; a second light source unit disposed adjacent to the lower extending portion to provide the lower extending portion with a second light; and a transmit-reflecting sheet disposed between the upper extending portion and the first light source unit to transmit the first light.

An exemplary embodiment of the present invention also discloses a display device, comprising a backlight unit to generate light; and a display unit to display an image with the light generated by the backlight unit, wherein the backlight unit, comprises a plurality of light-emitting blocks arranged in a matrix shape along a first direction and a second direction, wherein the first direction and the second direction are different from each other, each of light-emitting blocks comprising a light source unit, wherein each light source unit comprises at least one light-emitting chip to emit light and a light guiding unit to guide the light; and a light source driving section to control the light source unit of the light-emitting blocks and to drive the light source unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
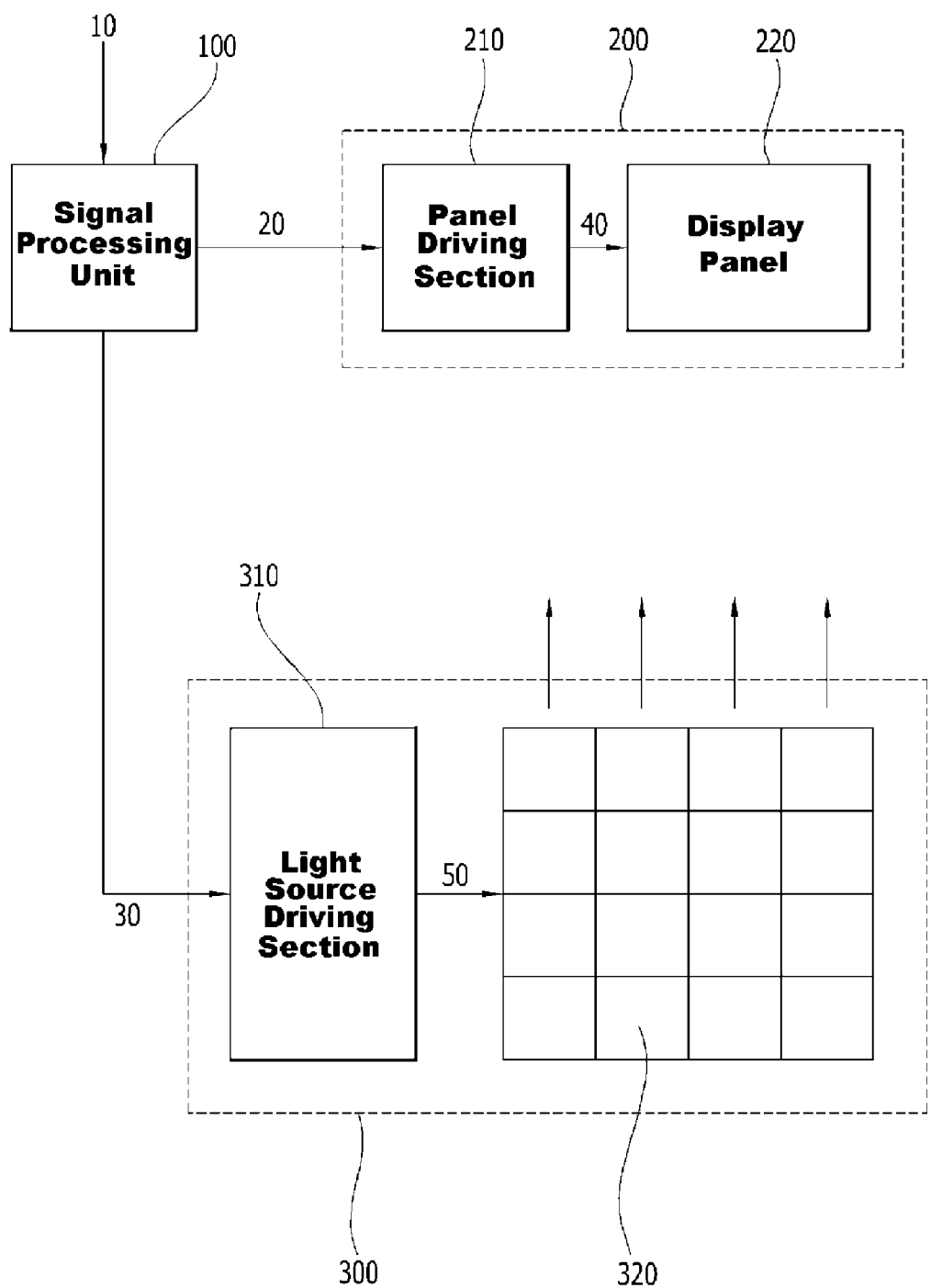
FIG. 1 is a block diagram illustrating a display apparatus according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a block diagram illustrating a display apparatus according to an exemplary embodiment of the present invention.

Referring to FIG. 1, a display apparatus according to an exemplary embodiment of the present invention includes a signal processing unit 100, a display unit 200, and a backlight unit 300.

The signal processing unit 100 receives an external image signal 10 including image data and image control signal. The signal processing unit 100 outputs a display control signal 20 for driving the display unit 200, and a backlight control signal 30 for driving the backlight unit 300 in response to the external image signal 10.

The display unit 200 receives the display control signal 20 from the signal processing unit 100 to display an image in response to the display control signal 20. For example, the display unit 200 may include a panel driving section 210 and a display panel 220.

The panel driving section 210 outputs a panel driving signal 40 for driving the display panel 220 in response to the display control signal 20. The display panel 220 receives the panel driving signal 40 from the panel driving section 210, and displays an image in response to the panel driving signal 40. For example, the display panel 220 may be a liquid crystal display (LCD) panel that displays an image by using the light generated by the backlight unit 300.

The LCD panel includes a first substrate (not shown), a second substrate (not shown) opposite to the first substrate and a liquid crystal layer (not shown) disposed between the first substrate and the second substrate. The first substrate may include signal lines, thin film transistors (TFTs) electrically connected to the signal lines, and pixel electrodes electrically connected to the TFTs. The second substrate may include a common electrode and color filters. The color filters may be disposed corresponding to the pixel electrodes. The liquid crystal layer adjusts light transmissivity when electric fields are generated between the pixel electrode and the common electrode.

The backlight unit 300 receives the backlight control signal 30 from the signal processing unit 100, and provides the display panel 220 with light in response to the backlight control signal 30. For example, the backlight unit 300 includes a light source driving section 310 and a plurality of light-emitting blocks 320.

The light source driving section 310 outputs light source driving signals 50 for individually controlling the plurality of light-emitting blocks 320 in response to the backlight control signal 30. The plurality of light-emitting blocks 320 individually emit light in response to the light source driving signals 50. In other words, the plurality of light-emitting blocks 320 emit light in a local dimming method.

Figure 2:
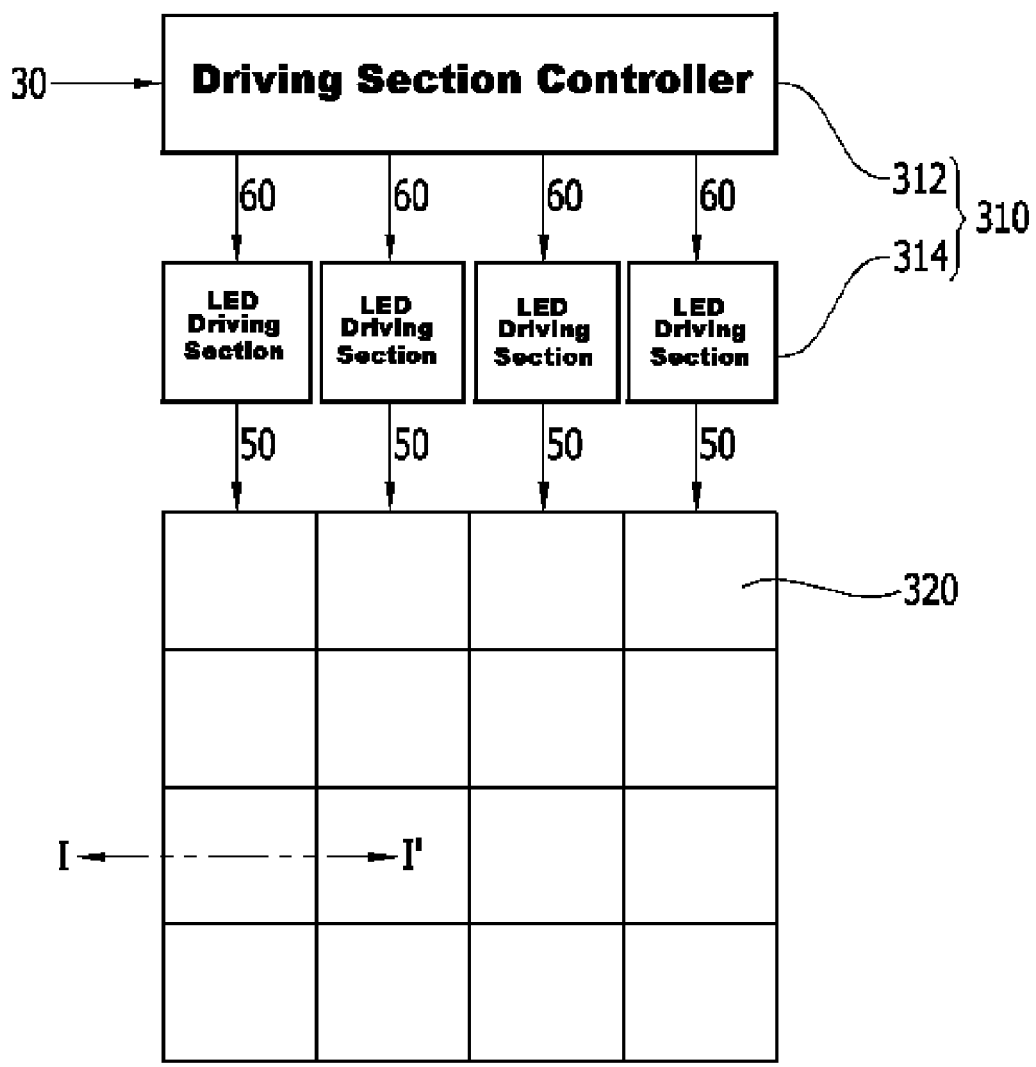
FIG. 2 is a block diagram illustrating a backlight unit in FIG. 1.

FIG. 2 is a block diagram illustrating a backlight unit in FIG. 1.

Referring to FIG. 1 and FIG. 2, the plurality of light-emitting blocks 320 are arranged in a matrix shape along a first direction DI1 and a second direction DI2 that is different from the first direction DI1. In FIG. 1 and FIG. 2, the plurality of light-emitting blocks 320 are arranged in, for example, 4×4 matrix shape.

The light source driving section 310 may include, for example, a driving section controller 312 and at least one LED driving section 314.

The driving section controller 312 receives the backlight control signal 30 from the signal processing unit 100, and outputs driving section control signals 60 for controlling the LED driving section 314 in response to the backlight control signal 30.

The LED driving section 314 receives the driving section control signal 60 from the driving section controller 312, and provides the plurality of light-emitting blocks 320 with the light source driving signals 50 in response to the driving section control signal 60.

For example, the number of the LED driving sections 314 may be four. That is, each of the LED driving sections 314 may control four light-emitting blocks 320 disposed in a line. Alternatively, the number of the LED driving sections 314 may be the same as the number of the light-emitting blocks 320. Alternatively, one LED driving section 314 may control all of the plurality of light-emitting blocks 320.

Figure 3:
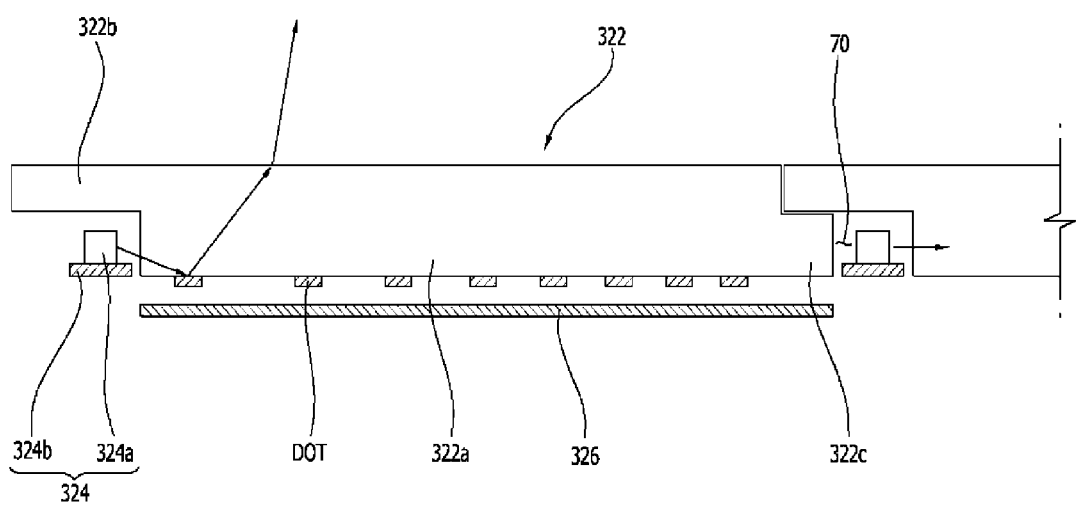
FIG. 3 is a cross-sectional view taken along a line I-I' in FIG. 2.
Figure 4:
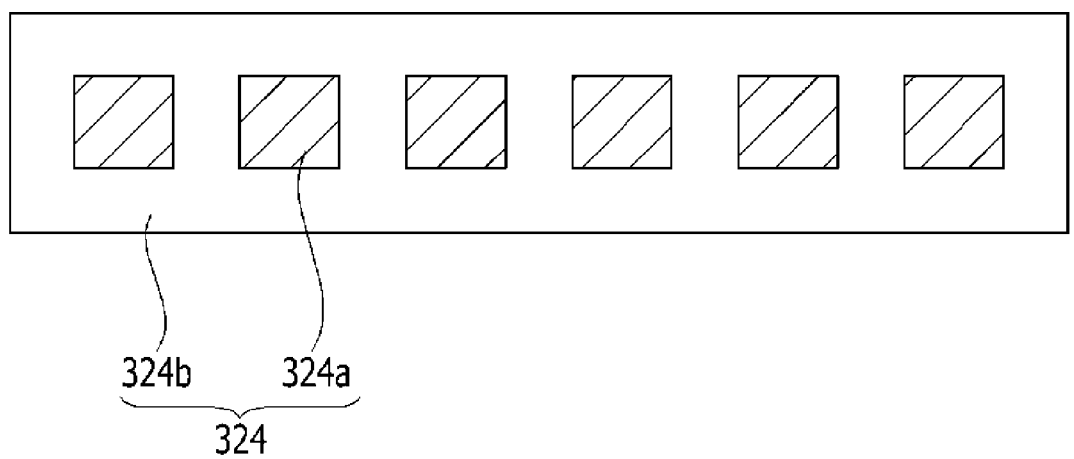
FIG. 4 is a plain view illustrating a light-emitting block in FIG. 3.

FIG. 3 is a cross-sectional view taken along a line I-I' in FIG. 2, and FIG. 4 is a plain view illustrating a light-emitting block in FIG. 3.

Referring to FIG. 2, FIG. 3 and FIG. 4, each of the plurality of light-emitting blocks 320 includes a light guiding unit 322, a light source unit 324 and a reflection sheet 326.

The light guiding unit 322 includes a light guiding body portion 322a and an upper extending portion 322b. The light guiding unit 322 may further include a lower extending portion 322c.

The light guiding body portion 322a may have a rectangular plate shape of which two sides extend in the first direction DI1 and the second direction DI2. The light guiding body portion 322a has a pair of side surfaces extending respectively in the first direction DI1 or the second direction DI2. The pair of side surfaces is an incident surface and an opposite surface. The incident surface is a surface through which light enters the light guiding body portion 322a, and the opposite surface is disposed opposite to the incident surface. In FIG. 2 and FIG. 3, for example, the incident surface and the opposite surface are disposed such that a normal line thereof is extended along the first direction DI1.

The upper extending portion 322b extends outwardly from a first side of the light guiding body portion 322a. That is, the upper extending portion 322b extends outwardly from the incident surface. The upper extending portion 322b is thinner than the light guiding body portion 322a. Therefore, a receiving space 70 may be defined under the upper extending portion 322b.

The lower extending portion 322c extends outwardly from a second side of the light guiding body portion 322a, which is opposite to the first side. That is, the lower extending portion 322c extends outwardly from the opposite surface. In this case, the lower extending portion 322c extends to be disposed in a receiving space 70 under an upper extending portion 322b of an adjacent light guiding unit 322 to support the upper extending portion 322b of the adjacent light guiding unit 322.

The lower extending portion 322c is shorter than the upper extending portion 322b to define a space in the receiving space 70, which receives the light source unit 324. For example, a summation of a thickness of the lower extending portion 322c and a thickness of the upper extending portion 322b may be substantially the same as a thickness of the light guiding body portion 322a.

The light source unit 324 is disposed such that the light source unit 324 faces the incident surface of the light guiding body portion 322a. The light source unit 324 generates light toward the incident surface in response to the light source driving signal 50 from the LED driving section 314. The light generated by the light source unit 324 enters the light guiding body portion 322a through the incident surface, and is guided by the light guiding body portion 322a toward an upper surface of the light guiding body portion 322a.

A lower surface of the light guiding body portion 322a, which is opposite to the upper surface, may have a plurality of reflection dots DOT. The reflection dots DOT adjust light paths by refracting, diffusing, and reflecting the light that enters the light guiding body portion 322a through the incident surface. The reflection dots DOT are formed such that a density of the reflection dots DOT increases along a direction from the incident surface to the opposite surface.

The light source unit 324 may include at least one light-emitting chip 324a and a driver substrate 324b.

The driver substrate 324b may extend along the incident surface of the light guiding body portion 322a. The driver substrate 324b is electrically connected to the LED driving section 314 to receive the light source driving signal 50.

The light-emitting chip 324a is disposed on the driver substrate 324b, and emits light in response to the light source driving signal 50. That is, the light-emitting chip 324a receives electric power through the driver substrate 324b to generate light. For example, a plurality of the light-emitting chips 324a may be arranged in at least one line along a longitudinal direction of the driver substrate 324b. In this case, the plurality of light-emitting chips 324a may be controlled by the light source driving signal 50 to generate light of the same luminance. Alternatively, the plurality of light-emitting chips 324a may be individually controlled by a plurality of different light source driving signals 50.

The light-emitting chip 324a may include white light emitting diode (LED) emitting white light. Alternatively, the light-emitting chip 324a may include a red LED emitting red light, a green LED emitting green light, and a blue LED emitting blue light.

The reflection sheet 326 is disposed on the lower surface of the light guiding body portion 322a. The reflection sheet 326 reflects light exiting the light guiding body portion 322a toward the light guiding body portion 322a to enter the light guiding body portion 322a, so that light-using efficiency may be improved.

Figure 5:
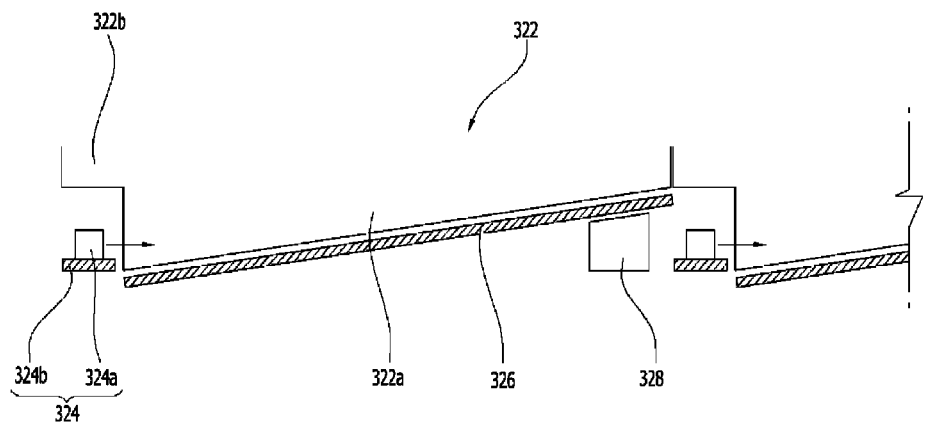
FIG. 5 is a cross-sectional view illustrating a portion of a light-emitting block according to another exemplary embodiment of the present invention.

FIG. 5 is a cross-sectional view illustrating a portion of a light-emitting block according to another exemplary embodiment of the present invention.

The display apparatus according to the present exemplary embodiment is substantially the similar to the display apparatus of the previous exemplary embodiment illustrated in FIG. 1 and FIG. 2 except for the shape of the light guiding unit. Thus, same reference numerals will be used to refer the same elements, and any further explanation will be omitted.

Referring to FIG. 2 and FIG. 5, a light guiding body portion 322a of the light guiding unit 322 has a wedge shape having a decreasing thickness in a direction from the first side to the second side. That is, the thickness of the light guiding body portion 322a decreases along a direction from the incident surface to the opposite surface that is opposite to the incident surface.

In the present embodiment, the light guiding unit 322 has only the upper extending portion 322b. However, the light guiding unit 322 may have both of the upper extending portion 322b and the lower extending portion 322c as shown in the previous embodiment and FIG. 3. A light guiding unit supporter 328 is disposed under the light guiding body portion 322a to support the light guiding body portion 322a. In this case, the light guiding unit supporter 328 is disposed adjacent to the opposite surface of the light guiding body portion 322a.

According to the present invention, the plurality of light-emitting blocks 320 are arranged in a matrix shape, and each of the light-emitting blocks 320 includes the light guiding unit 322 and the light-emitting chip 324a disposed adjacent to the light guiding unit 322, backlight unit 300 to reduce the thickness of the backlight unit 300 in comparison with a backlight unit of direct illumination type.

Furthermore, the plurality of light-emitting blocks 320 are individually controlled by the light source driving section 310. In other words, the plurality of light-emitting blocks 320 emit light in a local dimming method. Therefore, power consumption for driving the plurality of light-emitting blocks 320 may be reduced. Additionally, when the plurality of light-emitting blocks 320 is controlled in the local dimming method, contrast ratio and visibility of images displayed by the display apparatus may be improved.

Figure 6:
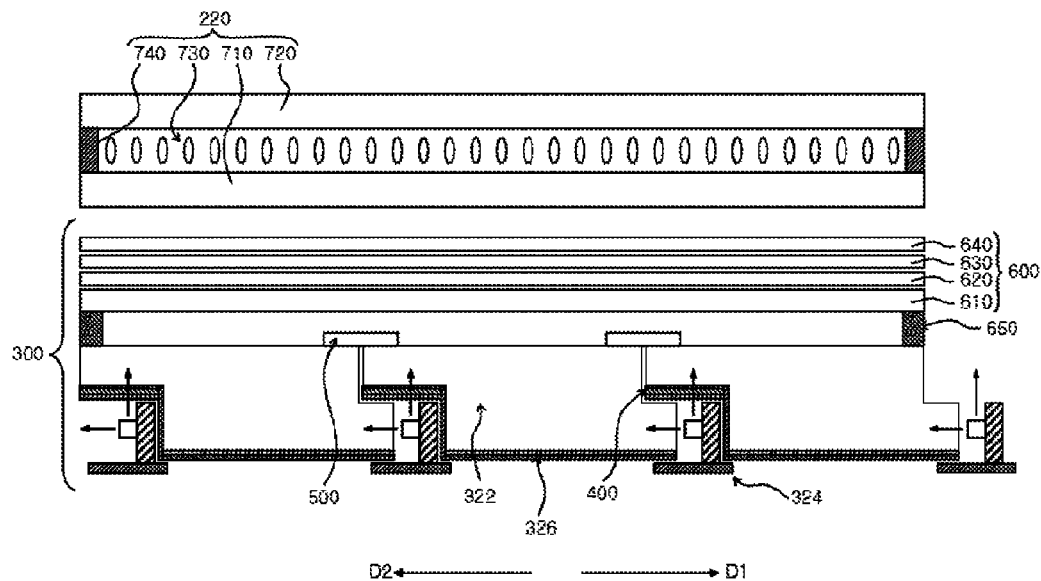
FIG. 6 is a cross-sectional view illustrating a display apparatus according to another exemplary embodiment of the present invention.
Figure 7:
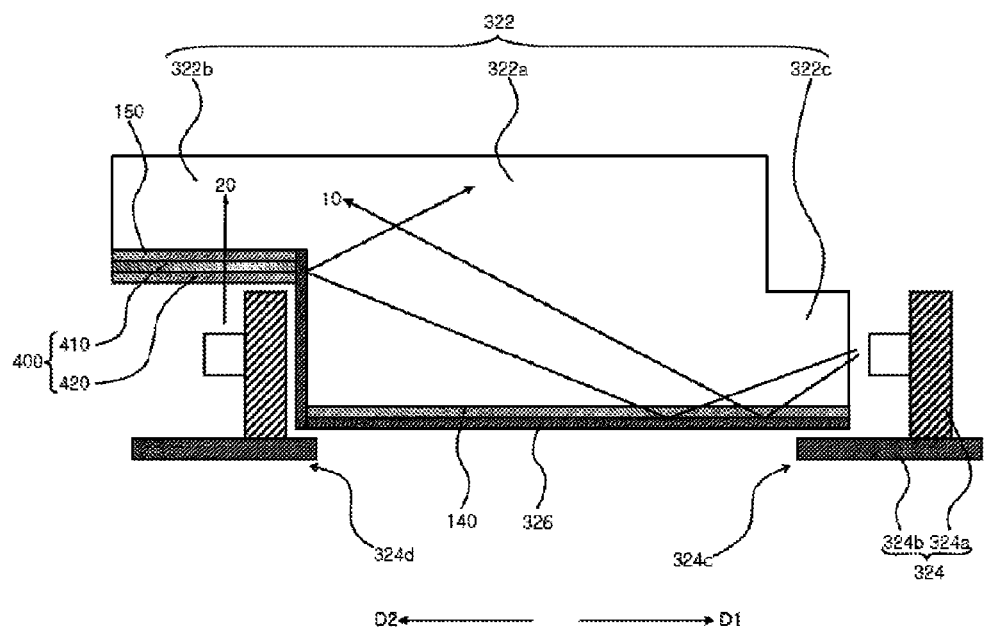
FIG. 7 is a cross-sectional view illustrating a portion of a backlight unit in FIG. 6 according to still another exemplary embodiment of the present invention.

FIG. 6 is a cross-sectional view illustrating a display apparatus according to another exemplary embodiment of the present invention, and FIG. 7 is a cross-sectional view illustrating a portion of a backlight unit in FIG. 6 according to still another exemplary embodiment of the present invention.

Referring to FIG. 6 and FIG. 7, a display apparatus according to another exemplary embodiment of the present invention includes a backlight unit 300 to generate light and a display panel 220 to display an image by using the light generated by the backlight unit 300.

The backlight unit 300 includes a plurality of light-emitting blocks 320, a plurality of reflection sheets 326, a plurality of optical sheets 400, a plurality of border region diffusion sheets 500, an optical member 600, and at least one optical member supporter 650. Each of the light-emitting blocks 320 includes a light source unit 324 and a light guiding unit 322.

The plurality of light-emitting blocks 320 may be arranged in a matrix shape in a receiving container (not shown). Each light guiding unit 322 includes a light guiding body portion 322a, a lower extending portion 322c, and an upper extending portion 322b.

The light guiding body portion 322a may have a rectangular plate shape. The light guiding body portion 322a has an upper surface through which light exits the light guiding body portion 322a, a lower surface that is opposite to the upper surface, and four side surfaces connecting the upper surface and the lower surface. The four side surfaces include an incident surface through which light enters the light guiding body portion 322a and an opposite surface that is disposed opposite to the incident surface.

The lower extending portion 322c extends from the incident surface of the light guiding body portion 322a in the first direction D1. The lower extending portion 322c may have a rectangular plate shape. The lower extending portion 322c extends from a lower portion of the incident surface of the light guiding body portion 322a such that the lower surfaces of the light guiding body portion 322a and the lower extending portion 322c are connected to each other. Furthermore, the lower extending portion 322c is thinner than the light guiding body portion 322a.

The upper extending portion 322b extends from the opposite surface of the light guiding body portion 322a in the second direction D2 that is opposite to the first direction D1. The upper extending portion 322b may have a rectangular plate shape. The upper extending portion 322b extends from an upper portion of the opposite surface of the light guiding body portion 322a such that the upper surfaces of the light guiding body portion 322a and the upper extending portion 322b are connected to each other. Furthermore, the upper extending portion 322b is thinner than the light guiding body portion 322a.

The lower surfaces of the light guiding body portion 322a and the lower extending portion 322c may have a main light-guiding pattern 140 for adjusting a light path, and the lower surface of the upper extending portion 322b may have a sub light-guiding pattern 150 for adjusting a light path. For example, the main light-guiding pattern 140 and the sub light-guiding pattern 150 may have dot patterns for diffused refraction and diffusion.

The light source units 324 are disposed adjacent to a side surface of the lower extending portion 322c of the light guiding units 322, respectively. Furthermore, a light source unit 324 is disposed under the upper extending portion 322b of an outermost region of each of the light guiding units 322 in the second direction D2. That is, the light source units 324 are disposed between the light guiding units 322, respectively. In other words, the light source units 324 are alternately disposed along with the light guiding units 322.

Each light source unit 324 may include a driver substrate 324b and at least one light-emitting chip 324a. The light-emitting chip 324a is mounted on the driver substrate 324b, and generates light when the light-emitting chip 324a receives electric power from the driver substrate 324b. The light-emitting chip 324a includes a light emitting diode (LED). For example, light-emitting chip 324a may include a white LED, a blue LED, etc. The light source units 324 may be individually controlled in a local dimming method.

The reflection sheets 326 are disposed under the light guiding units 322, respectively. For example, the reflection sheets 326 may be disposed on lower surfaces of the light guiding body portion 322a, the lower extending portion 322c, and the upper extending portion 322b, respectively. Furthermore, the reflection sheets 326 also may be disposed on a side surface of the light guiding body portion 322a, which connects the lower surface of the light guiding body portion 322a with the lower surface of the lower extending portion 322c. Alternatively, one reflection sheet 326 may be bent to cover the lower surfaces of the light guiding body portion 322a, the lower extending portion 322c, and the upper extending portion 322b.

The plurality of optical sheets 400 are disposed between the light source units 324 and the upper extending portions 322b of the light guiding units 322. For example, the plurality of optical sheets 400 may be attached to the lower surface of the upper extending portions 322b. The plurality of optical sheets 400 transmits light generated by the light source units 324 to provide the upper extending portions 322b with light.

The plurality of optical sheets 400 may include a transmit-reflecting sheet 410 and a diffusion sheet 420. For example, the transmit-reflecting sheet 410 may be disposed on a lower surface of the upper extending portions 322b, and the diffusion sheet 420 may be disposed on a lower surface of the transmit-reflecting sheet 410. Alternatively, the diffusion sheet 420 may be disposed on a lower surface of the upper extending portions 322b, and the transmit-reflecting sheet 410 may be disposed on a lower surface of the diffusion sheet 420.

The transmit-reflecting sheet 410 may transmit light generated by the light source unit 324 to provide the upper extending portion 322b with the light, and may reflect light, which advances toward the lower surface of the upper extending portion 322b, toward the upper surface of the upper extending portion 322b.

Alternatively, the transmit-reflecting sheet 410 may transmit a portion of light generated by the light source unit 324 and reflect a remaining portion of the light. For example, a white paper sheet may be employed as the transmit-reflecting sheet 410.

The plurality of border region diffusion sheets 500 is disposed at a border region between the light guiding units 322. The plurality of border region diffusion sheets 500 diffuses light emitted through the border region between the light guiding units 322 to improve luminance uniformity at the border region.

In detail, each border region diffusion sheet 500 may be disposed between the upper surface of the light guiding body portion 322a of a first light guiding unit of the light guiding units 322 and the upper surface of the upper extending portion 322b of a second light guiding unit of the light guiding units 322 adjacent to the first light guiding unit. In this case, the upper surface of the light guiding body portion 322a of the first light guiding unit and the upper surface of the upper extending portion 322b of the second light guiding unit may be connected to each other.

The optical member 600 is disposed over the light guiding units 322 to improve optical characteristics of light generated by the light guiding units 322. For example, the optical member 600 may include a light-diffusing plate 610 disposed over the light guiding units 322, a diffusion sheet 620 disposed on the light-diffusing plate 610, a prism sheet 630 disposed on the diffusion sheet 620, and a reflection-polarization sheet 640 disposed on the prism sheet 630.

The optical member supporter 650 is disposed between the light guiding units 322 and the optical member 600, so that the optical member 600 is spaced apart from the light guiding units 322. A plurality of the optical member supporters 650 may be arranged along edges of the light guiding units 322 and the optical member 600. When the plurality of optical member supporters 650 includes optically transparent material, the plurality of optical member supporters 650 may be disposed at the center portion of the light guiding units 322 and the optical member 600. In the present embodiment, the lower extending portion 322c of the first light guiding unit may overlap with the upper extending portion 322b of the second light guiding unit adjacent to the first light guiding unit, so that the lower extending portion 322c of the first light guiding unit may support the upper extending portion 322b of the second light guiding unit. That is, the lower extending portion 322c of the first light guiding unit may make contact with the optical sheets 400 on the lower surface of the upper extending portion 322b of the second light guiding unit to support the upper extending portion 322b.

As shown in FIG. 1, the display panel 220 is disposed over the backlight unit 300, and displays an image by using light generated by the backlight unit 300. The display panel 220 may be, for example, a liquid crystal display (LCD) panel.

With respect to FIG. 6, the LCD panel includes a first substrate 710, a second substrate 720 facing the first substrate 710, a liquid crystal layer 730 disposed between the first substrate 710 and the second substrate 720, and a seal line 740 disposed along edges of the first substrate 710 and the second substrate 720 to confine the liquid crystal layer 430.

The first substrate 710 includes signal lines, TFTs electrically connected to the signal lines, and pixel electrodes electrically connected to the TFTs. The second substrate 720 includes color filters respectively corresponding to the pixel electrodes and a common electrode. When electric fields are generated between the pixel electrode and the common electrode, an arrangement of liquid crystal molecules of the liquid crystal layer 730 is changed to alter the optical transmissivity of the liquid crystal layer 730.

Hereinafter, a path of light generated by the light source units 324 will be explained referring to FIG. 7. For convenience, a light source unit facing the lower extending portion 322c of a light guiding unit 322, which is disposed at right side of the light guiding unit 322, is referred to as a first light source unit 324c, and a light source unit disposed under the upper extending portion 322b of the light guiding unit 322, which is disposed at a left side of the light guiding unit 322, is referred to as a second light source unit 324d.

A portion of a first light generated by the first light source unit 324c enters the light guiding unit 322 through a side surface of the lower extending portion 322c, advances in the light guiding body portion 322a and exits from the light guiding unit 322 through the upper surface of the light guiding body portion 322a. In this case, the first light may be diffused, refracted or diffusedly reflected by the main light-guiding pattern 140 formed at the lower surfaces of the light guiding body portion 322a and the lower extending portion 322c, so that light path of the first light may be changed. Furthermore, a portion of the first light, which exits the light guiding unit 322, may be reflected by the reflection sheet 326 of the lower surfaces of the lower extending portion 322c and the side surface of the light guiding body portion 322a to re-enter the light guiding unit 322.

On the other hand, a portion 10 of the first light, which advances toward the upper surface of the upper extending portion 322b by the lower extending portion 322c and the light guiding body portion 322a, may exit from the light guiding unit 322 through the upper extending portion 322b.

The portion 10 of the first light may be diffused, refracted, or diffusedly reflected by the sub light-guiding pattern 150 formed at the lower surface of the upper extending portion 322b, so that light path of the first light may be changed. Furthermore, a portion of the portion 10 of the first light, which exits from the upper extending portion 322b, may be reflected by the transmit-reflecting sheet 410 to re-enter the upper extending portion 322b.

A portion of a second light generated by the second light source unit 324d, which advances toward the upper extending portion 322b (or a portion 20 of the second light) passes through the diffusion sheet 420 and the transmit-reflecting sheet 410 to enter the upper extending portion 322b. In this case, the transmit-reflecting sheet 410 may transmit all of or a portion of the portion 20 of the second light 20.

For example, the transmit-reflecting sheet 410 in the present invention reflects the portion 10 of the first light and transmits the portion 20 of the second light in the upper extending portion 322b. Alternatively, the transmit-reflecting sheet 410 may transmit a portion of light and reflect a remaining portion of the light.

According to the present exemplary embodiment, the portion 10 of the first light generated by the first light source unit 324a, passes through the lower extending portion 322c and the light guiding body portion 322a and exits the light guiding unit 322 through the upper surface of the upper extending portion 322b. Furthermore, the portion 20 of the second light generated by the second light source unit 324d enters the upper extending portion 322b through the lower surface of the upper extending portion 322b and exits the upper extending portion 322b through the upper surface of the upper extending portion 322b.

As a result, the portion 10 of the first light and the portion 20 of the second light exit from the upper extending portion 322b, so that a luminance over the upper extending portion 322b may be improved. Therefore, a dark line, which may be displayed over the upper extending portion 322b, may be reduced.

Furthermore, according to the conventional backlight unit, an optical member 600 should be spaced apart from the light guiding unit 322 in order to reduce the dark line. However, according to the present embodiment, there is no need to increase the distance between the light guiding unit 322 and the optical member 600, so that the thickness of the backlight unit 300 may be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
    a plurality of light-emitting blocks each comprising a light source unit, wherein each light source unit comprises a light-emitting chip to emit light and a light guiding unit to guide the light; and
    a light source driving section to separately control the light source unit of each of the light-emitting blocks and to separately drive the light source unit.

2. The backlight unit of claim 1, wherein the light guiding unit of each of the light-emitting blocks comprises:
    a light guiding body portion adjacent to the light source unit, the light guiding body portion to guide the light emitted by the light source unit; and
    an upper extending portion extended from an upper portion of a first side surface of the light guiding body portion, the upper extending portion being disposed over the light source unit.

3. The backlight unit of claim 2, wherein the light guiding unit further comprises a lower extending portion extended from a lower portion of a second side surface of the light guiding body portion, the second side surface being opposite to the first side surface, such that the lower extending portion is disposed under an upper extending portion of a light guiding unit of an adjacent light-emitting block.

4. The backlight unit of claim 2, wherein the light guiding body portion comprises a decreasing thickness along a direction from the first side surface to the second side surface.

5. The backlight unit of claim 1, wherein each of the light-emitting blocks further comprise a reflection sheet disposed on a lower surface of the light guiding unit.

6. The backlight unit of claim 1, wherein each of the light source units comprise a plurality of light-emitting chips, and the plurality of light-emitting chips are separately driven by the light source driving section.

7. The backlight unit of claim 6, wherein the plurality of light-emitting chips comprises a white light-emitting diode to generate white light.

8. The backlight unit of claim 6, wherein the plurality of light-emitting chips each comprise:
    a red light-emitting diode to generate red light;
    a green light-emitting diode to generate green light; and
    a blue light-emitting diode to generate blue light.

9. A display device, comprising:
    a backlight unit to generate light;
    a display unit to display an image with the light generated by the backlight unit; and
    a signal processing unit to output a display control signal to control the display unit in response to an external image signal; and a backlight control signal to control the backlight unit in response to the external image signal, wherein the backlight unit comprises:

a plurality of light-emitting blocks comprising a light source unit comprising a light-emitting chip to emit light and a light guiding unit to guide the light; and a light source driving section to separately control the light source unit of each of the light-emitting blocks in response to the backlight control signal.

10. The display device of claim 9, wherein each light source unit comprises a plurality of light-emitting chips, and the plurality of light-emitting chips is separately driven by the light source driving section.

11. The backlight unit of claim 10, wherein the plurality of light-emitting chips each comprise:

a red light-emitting diode to generate red light;

a green light-emitting diode to generate green light; and a blue light-emitting diode to generate blue light.

12. A backlight unit, comprising:

a light guiding unit comprising a light guiding body portion, an upper extending portion extended from an upper portion of a first side surface of the light guiding body portion, and a lower extending portion extended from a lower portion of a second side surface of the light guiding body portion, wherein the first side surface is opposite the second side surface;

a first light source unit disposed under the upper extending portion to provide the upper extending portion with a first light;

a second light source unit disposed adjacent to the lower extending portion to provide the lower extending portion with a second light; and a light source driving section to separately control the first light source unit and the second light source unit.

13. The backlight unit of claim 12, further comprising a transmit-reflecting sheet disposed between the upper extending portion and the first light source unit, the transmit-reflecting sheet to transmit the first light.

14. The backlight unit of claim 12, wherein the first light source unit and the second light source unit each comprise a plurality of light-emitting chips, and the plurality of light-emitting chips is separately driven by the light source driving section.

15. The backlight unit of claim 14, wherein the plurality of light-emitting chips each comprise:

a red light-emitting diode to generate red light;

a green light-emitting diode to generate green light; and a blue light-emitting diode to generate blue light.

* * * * *